United States Patent [19]

Rhodes, Jr.

[11] Patent Number: 4,968,465
[45] Date of Patent: Nov. 6, 1990

[54] METHOD OF CONTAINING FOAM DURING MOLDING OF FOAM-FILLED PRODUCTS

[75] Inventor: Richard D. Rhodes, Jr., Somersworth, N.H.

[73] Assignee: Davidson Textron Inc., Dover, N.H.

[21] Appl. No.: 414,393

[22] Filed: Sep. 29, 1989

[51] Int. Cl.$^5$ .............................................. B29C 67/22
[52] U.S. Cl. ................................. 264/46.5; 264/46.6; 264/139; 264/276
[58] Field of Search ............... 264/46.5, 46.6, 46.7, 264/261, 276, 278, 139; 156/245

[56] References Cited

U.S. PATENT DOCUMENTS

| | | | |
|---|---|---|---|
| 2,802,766 | 8/1957 | Leverenz | 264/46.6 |
| 3,400,182 | 9/1968 | Kolt | 264/46.6 |
| 4,154,786 | 5/1979 | Plasse | 264/46.7 |
| 4,303,728 | 12/1981 | Houdek et al. | 264/46.5 |
| 4,419,307 | 12/1983 | Kohara et al. | 264/46.6 |
| 4,420,447 | 12/1983 | Nakashima | 264/46.7 |
| 4,806,094 | 2/1989 | Rhodes, Jr. et al. | 264/46.6 |
| 4,814,036 | 3/1989 | Hatch | 264/276 |
| 4,891,081 | 1/1990 | Takahashi et al. | 264/46.6 |
| 4,923,539 | 5/1990 | Spengler et al. | 264/46.5 |

FOREIGN PATENT DOCUMENTS 56-118830 9/1981 Japan ............................. 264/46.5

*Primary Examiner*—David Simmons
*Assistant Examiner*—Allan R. Kuhns
*Attorney, Agent, or Firm*—John C. Evans

[57] ABSTRACT

A mold assembly for molding vinyl skin shell-covered and foam-filled products, such as an automotive instrument panel, wherein waste portions of the shell and foam are eliminated from the molded product. This eliminates having to manually trim such portions from the finished product after molding. Specifically, compressible foam or silicone rubber gaskets or spacers of predetermined shaped, such as the shape of an opening suitable for a radio speaker, are placed in the mold and compressed between the mold lid and the bottom surface of the mold cavity.

4 Claims, 1 Drawing Sheet

METHOD OF CONTAINING FOAM DURING MOLDING OF FOAM-FILLED PRODUCTS

TECHNICAL FIELD

This invention relates generally to apparatus for molding foam products, such as automotive instrument panels and, more particularly, to apparatus for molding such products so as to eliminate any waste material being included on the molded product.

BACKGROUND ART

Heretofore, preformed vinyl skin shells of a synthetic resin material, such as polyvinylchloride resin, which serve as the outer surface of the finished product, have covered the entire inner surfaces of the typical open pour-type mold cavity section, in order to keep mold clean after removal of the molded product. The entire shell surface is then covered by pouring an expanding urethane foam formulation thereon which is then restrained and spread once a mold lid is placed on the mold cavity section. Thereafter, particular sections of the vinyl shell and any adjacent foam must be cut out or trimmed to accommodate required openings in the finished product, e.g., radio speaker, odometer and speedometer openings, and the like, in automotive instrument panels.

DISCLOSURE OF THE INVENTION

Accordingly, a general object of the invention is to provide an improved molding arrangement wherein waste portions of vinyl skin shells are eliminated from the molded product.

Another object of the invention is to provide a molding arrangement wherein selected foam gasket inserts or spacers are employed in the mold assembly to serve as cores for spaces or openings which are required in the finished products.

A further object is to provide a molding arrangement wherein compressible foam gasket sleeves or spacers are mounted in the mold cavity section to eliminate wasting vinyl skin shell and any foam precursor materials in those spaces which would otherwise have to be trimmed to produce the finished product.

These and other objects and advantages will become more apparent when reference is made to the following drawings and the accompanying description.

BEST MODE FOR CARRYING OUT THE INVENTION

Figure 1:
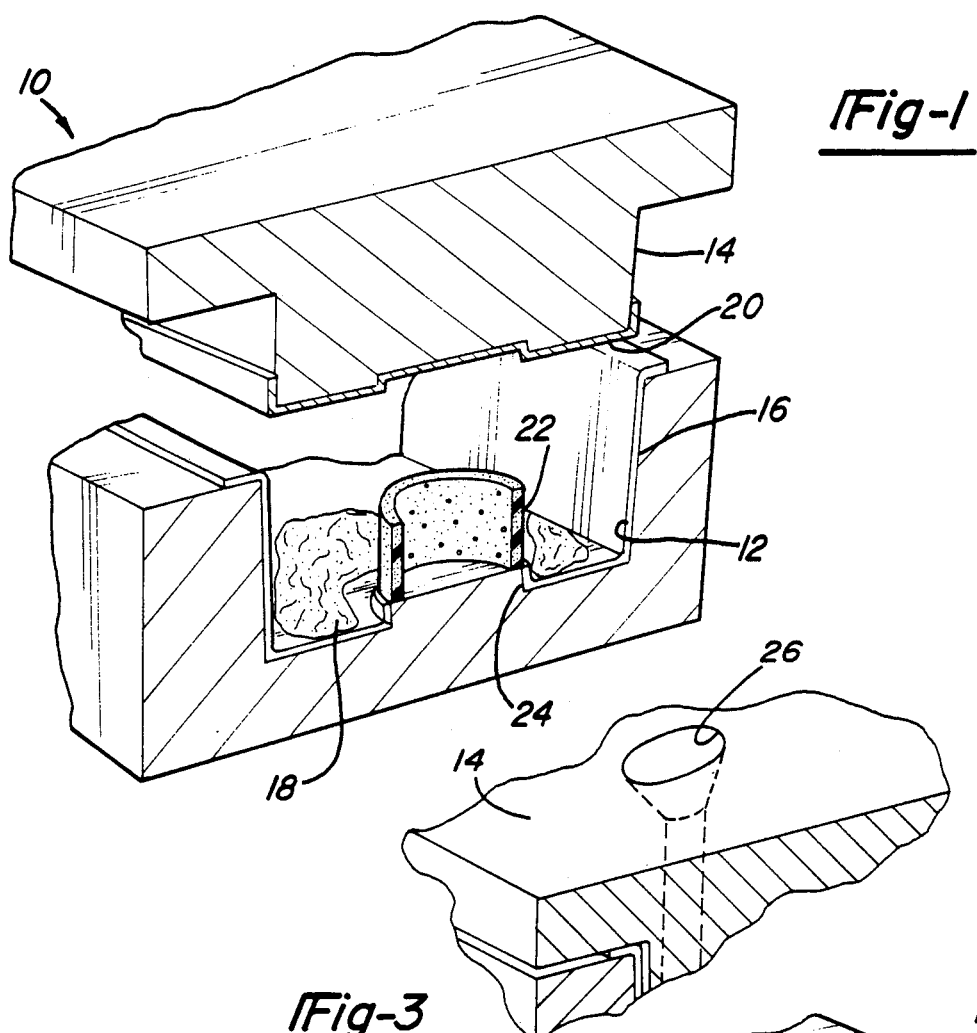
FIG. 1 is a cross-sectional perspective view of a mold assembly embodying the invention, prior to being closed.

Referring now to the drawings in greater detail, FIG. 1 illustrates a mold assembly 10 including a mold cavity section 12 and a mold lid 14 therefor, suitable for molding composite products having an outer shell backed by a layer of foam, e.g., an automotive instrument panel. The mold cavity section is typically completely lined with a vinyl skin shell 16 prior to pouring a suitable expandable urethane foam precursor formulation represented at 18, into the cavity onto the shell. The foam formulation 18 includes suitable adhesion material to insure adhesion of the foam to the vinyl skin shell 16. An insert 20, which is to serve as a backing retainer for the expanded foam formulation and to which the latter adheres, is typically temporarily supported in any convenient manner on the mold lid 14, such as by detachable pins or the like (not shown).

Figure 2:
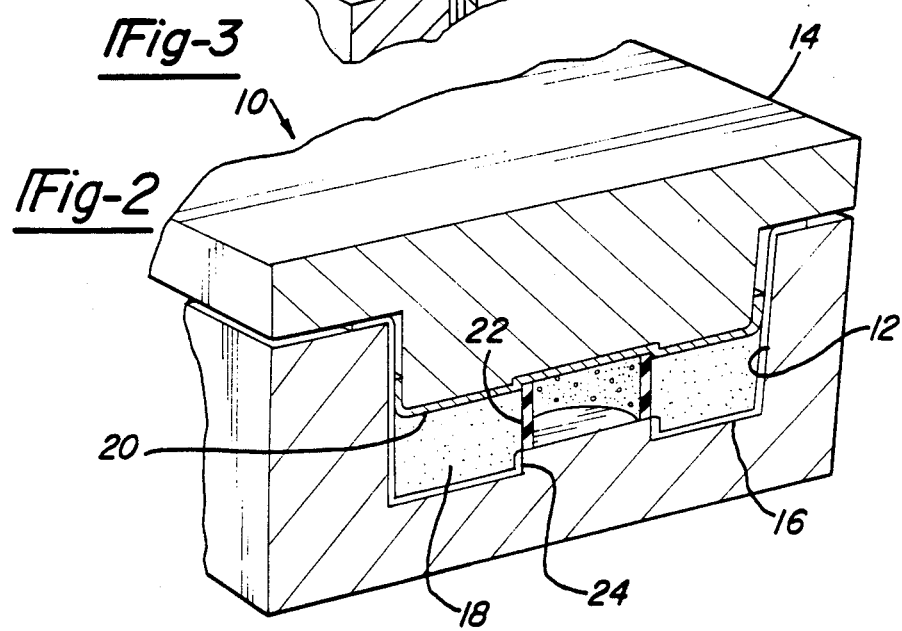
FIG. 2 is a cross-sectional perspective view of the mold assembly of FIG. 1 in a closed condition.

A compressible foam or silicone rubber gasket sleeve or spacer 22 is placed in the mold cavity section 12 around any so-called "waste" areas, i.e., any area which is to appear as an opening in the final molded product, for example, a radio speaker opening in the automotive instrument panel. Such an opening may, of course, typically be circular, oval, square or rectangular in shape. The gasket sleeve or spacer 22 would be shaped accordingly in cross-section, with the height thereof being slightly greater than the thickness of the product to be formed, so as to require a slight compression of the gasket when the mold lid 14 is closed on the mold cavity section 12 (FIG. 2).

As noted in the Figures, the preformed vinyl skin shell 16 initially includes an opening 24 therein, defining the shape of the opening, such as the speaker opening, which will appear in the final molded product. This eliminates the need to cut the opening in the final product, as has generally been the case heretofore.

Additionally, a minimal amount of foam formulation 18 is required since the space being filled by the expanding foam formulation is the exact shape required by the finished product. Hence, there is generally no need to cut out or trim any waste shell or waste foam after the product is removed from the mold assembly 10.

Depending upon whether accessories, such as the above referenced radio speakers, are mounted from the front or back of the molded instrument panel, an opening (not shown) may be formed in the backing insert 20 adjacent the area of the top of the foam gasket sleeve 22, in other words, directly above and aligned with the opening 24 in the vinyl skin shell 16 when the mold lid 14 is closed. When an opening is formed in the backing insert 20, the gasket sleeve 22 is formed so as to fit into the opening, and then be compressed therein by the mold lid 14 so as to prevent any leakage therepast of the expanding foam formulation 18 to the back side thereof.

The foam or silicone rubber gasket sleeve or spacer 22 may be covered with or include a suitable release agent to permit the molded product to readily separate therefrom. The gasket sleeve 22 preferably includes an adhesive backing that serves to hold it in place until the mold lid 14 is closed.

Figure 3:
FIG. 3 is a fragmentary cross-sectional perspective view of an alternate embodiment of the mold assembly of FIG. 1.

The pouring of the expandable urethane foam precursor formulation 18 into the cavity section 12 may be accomplished in the FIG. 1 arrangement prior to closing the mold lid 14. In the embodiment of FIG. 3, the foam precursor is poured into the cavity section 12 through an opening 26 formed in the mold lid 14.

Generally the foam type gasket sleeve 22 is not reusable due to expanding urethane foam penetration into the interstices of the foam sleeve. However, reuse would be possible if the sleeve 22 were formed of a closed cell compressible material and sprayed with a suitable release agent.

INDUSTRIAL APPLICABILITY

It should be apparent that the invention has virtually eliminated waste of vinyl shell material and any foam that would be located thereon extending to the mold lid, and minimized the handling time previously required to remove such waste material from the final molded product.

It should also be apparent that a plurality of gasket sleeves or shaped spacers may be used in a particular mold assembly, depending upon the number of openings to be included in the finished product.

It should be further apparent that cleaning of the mold after removal of the molded product should not be necessary, and the same as if a full-cover or non-perforated vinyl skin shell were used.

While but one embodiment of the invention has been shown and described, other modifications thereof are possible within the scope of the following claims.

The embodiments of the invention in which an exclusive property or privilege is claimed are defined as follows:

1. A method of forming a molded product comprising the steps of:
   a. placing in a mold cavity section of a predetermined configuration a vinyl skin shell having at least one opening formed therein;
   b. placing a compressible gasket sleeve of a predetermined height in the mold cavity section, said sleeve located within the opening in the vinyl skin shell;
   c. pouring an expandable foam formulation into the mold cavity section onto the vinyl skin shell;
   d. placing a mold lid bearing a detachable backing insert on top of the mold cavity section so as to compress the gasket sleeve to prevent the expandable foam formulation from filling the space occupied by the compressed foam gasket sleeve;
   e. allowing the foam formulation time to expand so as to become adhered to the vinyl skin shell, the compressed gasket sleeve, and the backing insert;
   f. removing the mold lid from the mold cavity section;
   g. removing the adhered backing insert, expanded foam formulation, vinyl skin shell and gasket sleeve from the mold cavity section; and
   h. removing the gasket sleeve, leaving the backing insert, foam formulation, and vinyl skin shell as the final molded product.

2. The method described in claim 1, wherein the gasket sleeve consists of one of a suitable foam or silicone rubber.

3. The method described in claim 1, wherein the expandable foam formulation is poured into the mold cavity section prior to placing the mold lid on top of the mold cavity section.

4. The method described in claim 1, wherein the expandable foam formulation is poured through an opening in the mold lid into the mold cavity section.

* * * * *